(12) United States Patent
He

(10) Patent No.: US 12,131,016 B2
(45) Date of Patent: Oct. 29, 2024

(54) INPUT METHOD AND APPARATUS, AND APPARATUS FOR INPUT

(71) Applicant: BEIJING SOGOU TECHNOLOGY DEVELOPMENT CO., LTD., Beijing (CN)

(72) Inventor: Fulin He, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/171,595

(22) Filed: Feb. 20, 2023

(65) Prior Publication Data

US 2023/0195304 A1 Jun. 22, 2023

Related U.S. Application Data

(63) Continuation of application No. PCT/CN2021/102189, filed on Jun. 24, 2021.

(30) Foreign Application Priority Data

Dec. 16, 2020 (CN) .......................... 202011494268.7

(51) Int. Cl.
*G06F 3/04883* (2022.01)
*G06F 3/041* (2006.01)

(52) U.S. Cl.
CPC ........ *G06F 3/04883* (2013.01); *G06F 3/0414* (2013.01); *G06F 2203/041* (2013.01)

(58) Field of Classification Search
CPC . G06F 3/04883; G06F 3/0414; G06F 3/04186
See application file for complete search history.

(56) References Cited

U.S. PATENT DOCUMENTS

| 2007/0109271 | A1  | 5/2007  | Wang    |             |
|--------------|-----|---------|---------|-------------|
| 2011/0265002 | A1* | 10/2011 | Hong    | G06F 3/0488 |
|              |     |         |         | 345/173     |
| 2013/0201155 | A1* | 8/2013  | Wu      | G06F 3/03547 |
|              |     |         |         | 345/173     |
| 2016/0180160 | A1* | 6/2016  | VanBlon | G06F 3/04883 |
|              |     |         |         | 382/189     |
| 2016/0378251 | A1* | 12/2016 | Aznoe   | G06F 3/0488 |
|              |     |         |         | 345/158     |

FOREIGN PATENT DOCUMENTS

| CN | 101630219 A | 1/2010 |
| CN | 105700801 A | 6/2016 |

OTHER PUBLICATIONS

The World Intellectual Property Organization (WIPO) International Search Report for PCT/CN2021/102189 Sep. 27, 2021 5 Pages (including translation).

* cited by examiner

*Primary Examiner* — Robin J Mishler
(74) *Attorney, Agent, or Firm* — ANOVA LAW GROUP PLLC

(57) ABSTRACT

An input method and apparatus are provided. The input method includes: detecting in real time a touch point position during a handwriting input process on a user device; determining a display point position based on the touch point position and user-related information, the display point position being deviated from the touch point position; and presenting a touch point movement trajectory based on the display point position.

19 Claims, 7 Drawing Sheets

INPUT METHOD AND APPARATUS, AND APPARATUS FOR INPUT

CROSS-REFERENCES TO RELATED APPLICATIONS

The present disclosure is a continuation application of PCT Patent Application No. PCT/CN2021/102189, entitled "INPUT METHOD AND DEVICE, AND DEVICE FOR INPUT" and filed on Jun. 24, 2021, which claims priority to Chinese Patent Application No. 202011494268.7, filed with the Chinese Patent Office on Dec. 16, 2020, and entitled "INPUT METHOD AND APPARATUS, AND APPARATUS FOR INPUT", the entire contents of both of which are incorporated herein by reference.

FIELD OF THE TECHNOLOGY

Embodiments of the present disclosure relate to the field of computer technologies, and specifically, to an input method and apparatus, and an apparatus for input.

BACKGROUND OF THE DISCLOSURE

With the development of computer technologies, input method applications have richer functions. When inputting content by using an input method application, a user may adopt an encoding input method or other methods such as handwriting input.

In the related technology, when content is inputted by using methods such as handwriting input, a stroke is usually rendered at a touch point position. Therefore, the stroke is blocked by a touch medium.

SUMMARY

The embodiments of the present disclosure provide an input method and apparatus, and an apparatus for input, to resolve a technical problem that the input efficiency and the input accuracy rate are low in the related technology because the sight line is blocked during a handwriting input process.

According to a first aspect, an embodiment of the present disclosure provides an input method. The method includes: detecting in real time a touch point position during a handwriting input process on a user device; determining a display point position based on the touch point position and user-related information, the display point position being deviated from the touch point position; and presenting a touch point movement trajectory based on the display point position.

According to a second aspect, an embodiment of the present disclosure provides an input apparatus. The apparatus includes: an obtaining unit, configured to detect in real time a touch point position during a handwriting input process on a user device; a determining unit, configured to determine a display point position based on the touch point position and user-related information, the display point position being deviated from the touch point position; and a presenting unit, configured to present a touch point movement trajectory based on the display point position.

According to a third aspect, an embodiment of the present disclosure provides an apparatus for input, including a memory and one or more programs, the one or more programs being stored in the memory, the apparatus being configured such that one or more processors execute instructions in the one or more programs to perform the following operations: detecting in real time a touch point position during a handwriting input process on a user device; determining a display point position based on the touch point position and user-related information, the display point position being deviated from the touch point position; and presenting a touch point movement trajectory based on the display point position.

According to a fourth aspect, an embodiment of the present disclosure provides a non-transitory computer-readable medium, storing a computer program, the program, when executed by a processor, implementing the method according to the first aspect.

In the input method and apparatus, and the apparatus for input provided in the embodiments of the present disclosure, a touch point position during a handwriting input process on a user device is detected in real time, then a display point position deviated from the touch point position is determined based on the touch point position and user-related information, and finally a touch point movement trajectory is presented based on the display point position. In this way, the displayed touch point movement trajectory (that is, a stroke inputted by the user) can be deviated from a touch point of the user, so as to prevent a touch medium from covering and blocking the displayed stroke. Therefore, the user can see in real time a complete stroke during the handwriting input process, thereby improving the input efficiency and the input accuracy rate.

BRIEF DESCRIPTION OF THE DRAWINGS

Other features, objectives, and advantages of the present disclosure become more obvious by reading the detailed description of non-limiting embodiments that is provided with reference to the following accompanying drawings.

DESCRIPTION OF EMBODIMENTS

The present disclosure is further described in detail below with reference to the accompanying drawings and embodiments. It may be understood that specific embodiments described herein are only used to explain a related invention, but not to limit the invention. In addition, for ease of description, the accompanying drawings only show parts relevant to the related invention.

The embodiments in the present disclosure and features in the embodiments may be mutually combined when no conflict occurs. The present disclosure is described in detail in the following with reference to the accompanying drawings by using embodiments.

Figure 1:
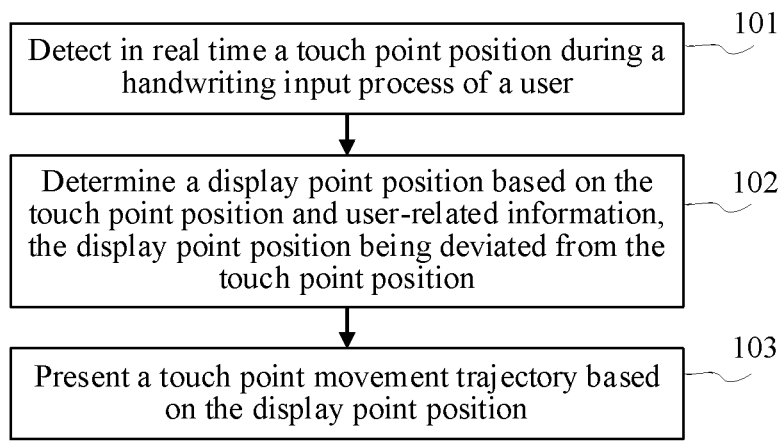
FIG. 1 is a flowchart of an embodiment of an input method according to the present disclosure.

FIG. 1 shows a procedure 100 of an embodiment of an input method according to the present disclosure. The input method may be applied to various electronic devices. The electronic devices include, but are not limited to, a server, a smart phone, a tablet computer, an e-book reader, a moving picture experts group audio layer III (MP3) player, a moving picture experts group audio layer IV (MP4) player, a laptop portable computer, a vehicle-mounted computer, a desktop computer, a set-top box, a smart television, a wearable device (such as an adult smartwatch or a kid smartwatch), and the like.

An input method application mentioned in the embodiments of the present disclosure can support a plurality of input methods. The input method may be an encoding method for inputting various symbols into an electronic device such as a computer or a mobile phone. A user may use the input method application to conveniently input a required character or character string into the electronic device. The input method in the embodiments of the present disclosure supports not only common Chinese input methods (such as a pinyin input method, a Wubi input method, a Zhuyin input method, a voice input method, and a handwriting input method), but also input methods of other languages (such as an English input method, a Japanese hiragana input method, and a Korean input method). The input method and the language of the input method are not limited herein.

The input method in this embodiment may include the following steps:

Step 101. Detect in real time a touch point position during a handwriting input process on a user device.

In this embodiment, an execution body (such as the foregoing electronic device) of the input method may be installed with an input method application (that is, an input method client). The input method application may support a handwriting input function. After the handwriting input function is enabled, a handwriting input panel may be displayed on an interface of the input method. The user may perform handwriting input on the handwriting input panel.

During a handwriting input process of the user, the execution body may detect in real time a touch point position of the user. A touch point is a point where the user touches the handwriting input panel. The touch point position may be represented by using coordinates. For example, a rectangular coordinate system may be established with a point on a display screen (such as a fixed point at the upper left corner) as an origin, and the coordinates of the touch point position in the rectangular coordinate system are obtained, so as to obtain the touch point position represented by the coordinates.

During the handwriting input process of the user, the touch point position usually changes in real time, and the execution body may obtain the touch point position in real time during the handwriting input process of the user, so as to obtain a plurality of consecutive touch point positions.

The user may perform handwriting input by using a finger directly, or may perform handwriting input by using another auxiliary tool (such as a stylus), or may perform handwriting input by using another part of a body (such as an elbow, a nose tip, a chin, or a foot). A medium used by the user to perform handwriting input is not specifically limited in this embodiment.

Content inputted through handwriting input is not specifically limited in this embodiment of the present disclosure. For example, the content may include, but is not limited to: a text, a number, an expression, a sign, an image, and the like.

Step 102. Determine a display point position based on the touch point position and user-related information, the display point position being deviated from the touch point position.

In this embodiment, the execution body may first obtain the user-related information, and then determine in real time, based on the touch point position detected in real time in step 101 and the user-related information, the display point position that has an offset from the touch point position. Each touch point position obtained by the execution body in real time may correspond to one display point position. A display point is a point on the handwriting input panel.

The user-related information may include various information related to the user, such as configuration information, historical information, real-time touch information, and touch medium information of the user on the input method client. The execution body may determine the display point position based on one or more pieces of the user-related information. For example, the historical information may include a historical position offset between a touch point position and a display point position during historical handwriting input by the user. The execution body may determine a current display point position based on the historical position offset and a touch point position of a touch point detected in real time currently. For another example, the touch medium information may include information such as a size of a contact surface between a touch medium and the screen, and the like. A correspondence between the size of the contact surface and an offset may be preset, so that the larger the size of the contact surface is, the greater the offset is.

There is an offset between the display point position and the touch point position. Therefore, the touch point position of the user and the display point position are prevented from overlapping with each other, thereby avoiding that the touch medium of the user device blocks a sight line of the user. Therefore, the user can see in real time a complete stroke so as to draw the stroke accurately, which improves the accuracy of content inputted through handwriting and the input efficiency.

In some example implementations of this embodiment, the user-related information may include a preset position offset defined by the user. The preset position offset may refer to an offset between the touch point position and the display point position. The execution body may determine the display point position based on the touch point position and the preset position offset. In an example, a position offset may be a coordinate difference between the touch point position and the display point position, and may include a difference in abscissa and a difference in ordinate. In this case, the coordinates of the touch point position may be added with the coordinate difference to obtain the display point position. For example, if the coordinates of the touch point position are (A, B), and the position offset is (C, D), coordinates of the display point position are (A+C, B+D).

Through the position offset predefined by the user, the user can configure the display point position at a preferred location according to an input habit. In this way, the accuracy of content inputted through handwriting is improved and the personalized handwriting input requirements of the user can be met.

In some example implementations of this embodiment, the position offset between the touch point position and the display point position may also be automatically calculated by the execution body. Specifically, the user-related information may include real-time touch information. The real-time touch information may include, but is not limited to, at least one of the following: a touch manner, a touch point pressure, or a touch point area. The touch manner may include, but is not limited to, at least one of the following: a touch by a left hand, a touch by a right hand, or a touch by both hands. The touch by a left hand may refer to a touch by using the left hand as a touch medium, or may refer to a touch by using a touch medium (such as a stylus) controlled by the left hand. The touch by a right hand may refer to a touch by using the right hand as a touch medium, or may refer to a touch by using a touch medium (such as a stylus) controlled by the right hand. The touch by both hands may refer to a touch by using both hands as a touch medium, or may refer to a touch by using touch media controlled by both hands (for example, controlling two styluses at the same time). The execution body may determine a display point position corresponding to each touch point position through the following sub-step S11 to sub-step S12:

Sub-step S11. Determine a target position offset based on the real-time touch information.

A correspondence between the real-time touch information and the target position offset may be preset, so that a position offset corresponding to current real-time touch information can be queried based on the correspondence. The queried position offset is used as the target position offset.

In an example, the real-time touch information may include the touch manner. A correspondence between different touch manners and position offsets may be preset, so that the target position offset may be obtained by querying the correspondence based on the touch manner in the real-time touch information. In practice, the correspondence may specifically include: a touch by a left hand corresponds to a first position offset, a touch by a right hand corresponds to a second position offset, and a touch by both hands corresponds to a third position offset. A display point position obtained through calculation by using the first position offset may be located at the upper right of the touch point position, so as to prevent the display point position from being blocked by the left hand of the user. A display point position obtained through calculation by using the second position offset may be located at the upper left of the touch point position, so as to prevent the display point position from being blocked by the right hand of the user. A display point position obtained through calculation by using the third position offset may be located directly above the touch point position, so as to prevent the display point position from being blocked by both hands of the user. For example, a rectangular coordinate system is established with an upper left vertex of the display screen as an origin. If the first position offset is (200, −50), the second position offset may be (−200, −50), and the third position offset may be (0, −50). A relative position relationship between the touch point position and the display point position in different touch manners is not limited to the foregoing descriptions, and other settings may be adopted according to requirements.

In still another example, the real-time touch information may include the touch point pressure. A relational expression between the touch point pressure and the position offset may be preset, so that the target position offset may be obtained by inputting a touch point pressure value into the relational expression. The touch point pressure and the position offset may be positively correlated. That is, the greater the touch point pressure is, the greater the position offset is. The foregoing relational expression may be preset through a large quantity of experiments and data statistics, which is not specifically limited herein. It may be understood that, to avoid a jump of the target position offset caused by a change in the touch point pressure during a manual input process of the user, the target position offset may be determined by using an initial touch point pressure during the current manual input of the user. In this way, a fixed target position offset is obtained, to ensure that a displayed stroke matches a trajectory drawn by the user.

In still another example, the real-time touch information may include the touch point area. A relational expression between the touch point area and the position offset may be preset, so that the target position offset may be obtained by inputting a touch point area value into the relational expression. The touch point area and the position offset may be positively correlated. That is, the larger the touch point area is, the greater the position offset is. The foregoing relational expression may be preset through a large quantity of experiments and data statistics, which is not specifically limited herein. It may be understood that, to avoid a jump of the target position offset caused by a change in the touch point area during a manual input process of the user, the target position offset may be determined by using an initial touch point area during the current manual input of the user. In this way, a fixed target position offset is obtained, to ensure that a displayed stroke matches a trajectory drawn by the user.

In still another example, the real-time touch information may include both the touch point pressure and the touch point area. A relational expression between the touch point pressure as well as the touch point area and the position offset may be preset, so that the target position offset may be obtained by inputting both a touch point pressure value and a touch point area value into the relational expression. The touch point pressure and the touch point area may be positively correlated with the position offset. The foregoing relational expression may be preset through a large quantity of experiments and data statistics, which is not specifically limited herein.

In still another example, the real-time touch information may include the touch manner, the touch point pressure, and the touch point area. In this case, the target position offset may be determined according to the following steps:

First, a size of a touch medium of the user device is predicted based on the touch point pressure and the touch point area. The touch medium may include, but is not limited to, a body part such as a finger, a nose tip, a mouth, a foot, or an elbow, and a handwriting tool such as a stylus. The size of the touch medium may be obtained based on a pre-trained touch medium size prediction model. The execution body may input the touch point pressure and the touch point area into the model to obtain a predicted size of the touch medium. The touch medium size prediction model may be pre-trained by using a machine learning method (such as a supervised learning method). For example, a sample set may be obtained first. The sample set includes a large quantity of samples, and each sample is a triplet that includes a touch point pressure, a touch point area, and a size of a touch medium. Then, the touch point pressure and the touch point area in the sample are used as an input, and the size of the touch medium is used as an output, to obtain the touch medium size prediction model through training.

Then, a direction of the display point position relative to the touch point position is determined based on the touch manner. Reference may be made to the description in the foregoing example, and details are not described herein again.

Finally, the target position offset is determined based on the size of the touch medium and the direction of the display point position relative to the touch point position. A correspondence between the size of the touch medium and the position offset may be preset. For example, the size of the touch medium may be positively correlated with the position offset. The correspondence may be preset through a large quantity of experiments and data statistics, which is not specifically limited herein. The position offset can be queried through the correspondence. Then, whether the position offset is a positive/negative value is determined based on the direction of the display point position relative to the touch point position, so as to obtain a final target position offset.

For example, a rectangular coordinate system is established with an upper left fixed point on the display screen as an origin, a horizontal direction is an X-axis, and a vertical direction is a Y-axis. If the display point position is at the upper right of the touch point position when the left hand touches the screen, an x-direction component of the target position offset may be positive, and a y-direction component of the target position offset may be negative. If the display point position is at the upper left of the touch point position when the right hand touches the screen, an x-direction component of the target position offset may be negative, and a y-direction component of the target position offset may be negative. If the display point position is at the upper left of the touch point position when the right hand touches the screen, an x-direction component of the target position offset may be zero, and a y-direction component of the target position offset may be negative.

Sub-step S12. Determine the display point position based on the touch point position and the target position offset.

The step of determining the display point position herein is substantially the same as the step of determining the display point position based on the touch point position and the preset position offset in the foregoing example implementations, and details are not described herein again.

By automatically calculating the target position offset, there is no need for the user to predefine the target position offset, thereby improving the convenience of handwriting input.

Step 103. Present a touch point movement trajectory based on the display point position.

Figure 2:
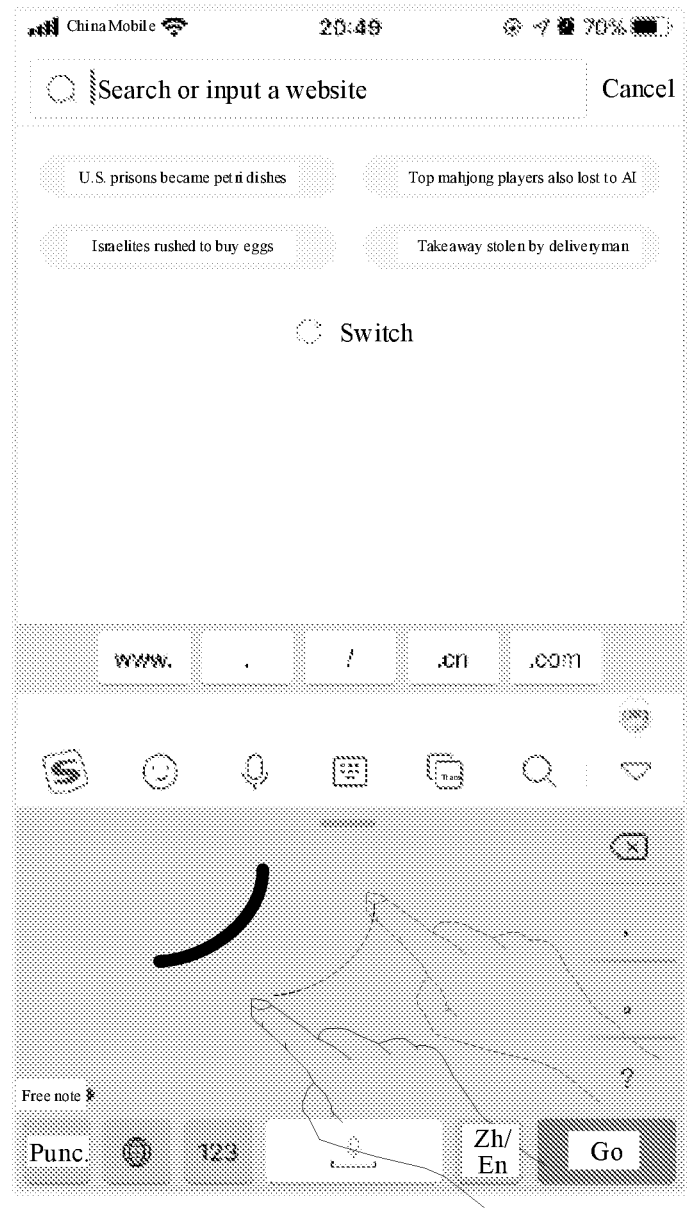
FIG. 2 is a schematic diagram of an application scenario of an input method according to the present disclosure.

In this embodiment, because the touch point during the handwriting input process of the user moves in real time, the touch point movement trajectory may be formed. Because each touch point has a corresponding display point, the touch point movement trajectory may be presented by displaying in a distinguished manner the display points determined in sequence. Therefore, the execution body may render pixels in the display point position according to a preset style, so as to present the touch point movement trajectory, where the touch point movement trajectory is the stroke inputted by the user. Referring to a schematic diagram of an application scenario shown in FIG. 2, the user draws a stroke on the handwriting input panel, and the stroke inputted by the user may be presented in a left region deviated from a real-time touch point position of the user, thereby preventing the stroke from being block by a hand of the user.

In some example implementations of this embodiment, during the handwriting input process of the user, the execution body may detect a touch operation by the user on the handwriting input panel and a touch stop operation. A touch duration may be monitored when the touch operation by the user on the handwriting input panel is detected. An operation button on the handwriting input panel may be hidden or display of the operation button may be weakened when the touch duration reaches a first preset value (such as 300 ms), and the operation button may be, for example, a keyboard switching button, a voice input button, a Chinese-English switching button, a line feed button, a punctuation button, or the like. Weakened display may be display with preset low transparency. Therefore, the operation button on the handwriting input panel may be automatically hidden or the display of the operation button may be automatically weakened after the user starts to write, thereby providing a larger handwriting region for the user to perform a handwriting operation conveniently.

Figure 3:
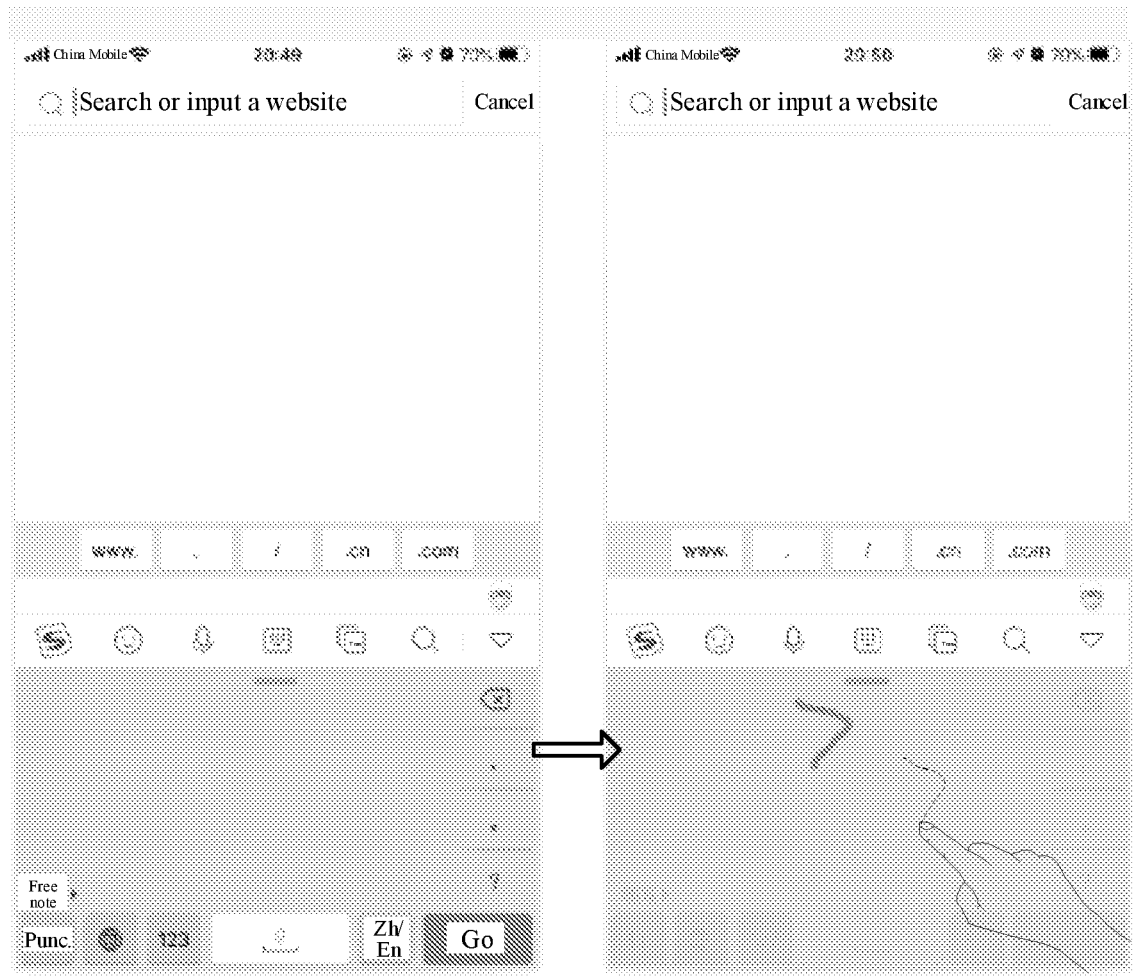
FIG. 3 is a schematic diagram of a hiding process of an operation button of a handwriting input panel according to the present disclosure.

For example, FIG. 3 is a schematic diagram of a hiding process of an operation button of a handwriting input panel according to the present disclosure. When the user does not perform handwriting input, the handwriting input panel includes a plurality of operation buttons. After the user to start to input, display of the operation buttons is weakened.

In some example implementations of this embodiment, when detecting that the touch operation stops, the execution body may further monitor a touch stop duration. Display of the operation button that is hidden or whose display is weakened may be resumed when the touch stop duration reaches a second preset value (such as 300 ms), thereby making it convenient for the user to perform another operation after handwriting input is finished.

Figure 4:
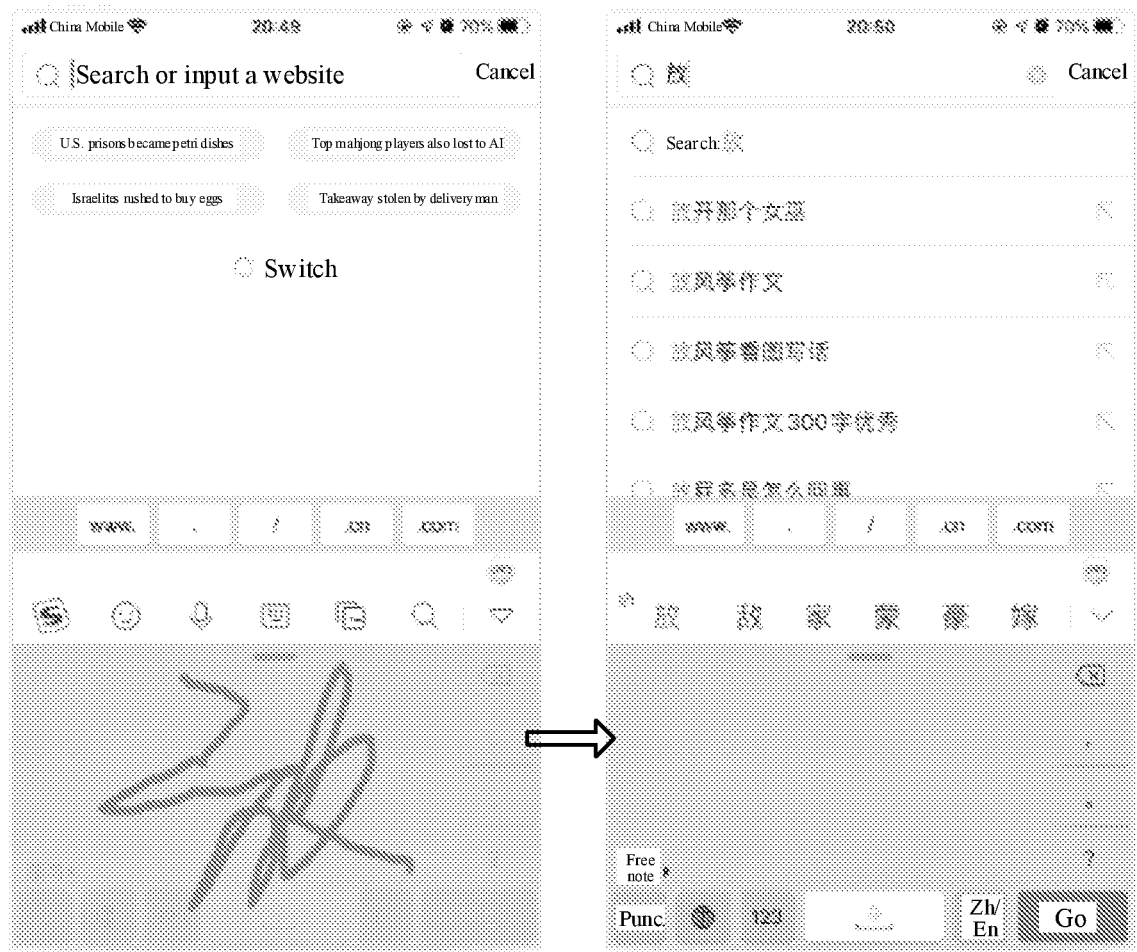
FIG. 4 is a schematic diagram of a displaying process of an operation button of a handwriting input panel according to the present disclosure.

For example, FIG. 4 is a schematic diagram of a displaying process of an operation button of a handwriting input panel according to the present disclosure. As shown in FIG. 4, a Chinese character "放" is handwritten on the left interface with operation buttons being weakened. Once the user completes writing on the right interface, display of the operation buttons whose display is weakened is resumed.

In the method provided in the foregoing embodiment of the present disclosure, a touch point position during a handwriting input process on a user device is detected in real time, then a display point position deviated from the touch point position is determined based on the touch point position and user-related information, and finally a touch point movement trajectory is presented based on the display point position. In this way, a displayed stroke can be deviated from a touch point of the user, so as to prevent a touch medium of the user device from covering and blocking the displayed stroke. Therefore, the user can see in real time a complete stroke during the handwriting input process, thereby improving the input efficiency and the input accuracy rate.

Figure 5:
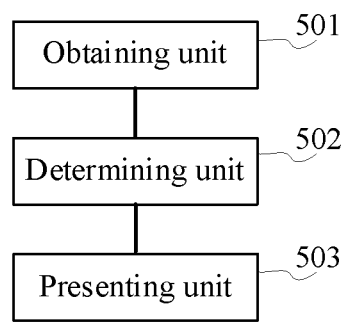
FIG. 5 is a schematic structural diagram of an embodiment of an input apparatus according to the present disclosure.

Further referring to FIG. 5, in an implementation of the method shown in the foregoing figures, the present disclosure provides an embodiment of an input apparatus. The apparatus embodiment corresponds to the method embodiment shown in FIG. 1. This apparatus is specifically applicable to various electronic devices.

As shown in FIG. 5, an input apparatus 500 in this embodiment includes: an obtaining unit 501, configured to detect in real time a touch point position during a handwriting input process on a user device; a determining unit 502, configured to determine a display point position based on the touch point position and user-related information, the display point position being deviated from the touch point position; and a presenting unit 503, configured to present a touch point movement trajectory based on the display point position.

In some example implementations of this embodiment, the user-related information includes the preset position offset defined by the user; and the determining unit 502 is further configured to: determine the display point position based on the touch point position and the preset position offset.

In some example implementations of this embodiment, the user-related information includes real-time touch information; and the determining unit 502 is further configured to: determine a target position offset based on the real-time touch information; and determine the display point position based on the touch point position and the target position offset.

In some example implementations of this embodiment, the real-time touch information includes at least one of the following: a touch manner, a touch point pressure, or a touch point area.

In some example implementations of this embodiment, the touch manner includes, but is not limited to, at least one of the following: a touch by a left hand, or a touch by a right hand.

In some example implementations of this embodiment, the determining unit 502 is further configured to: predict a size of a touch medium of the user device based on the touch point pressure and the touch point area; determine a direction of the display point position relative to the touch point position based on the touch manner; and determine the target position offset based on the size of the touch medium and the direction.

In some example implementations of this embodiment, the apparatus further includes a first detection unit configured to: monitor a touch duration upon detecting a touch operation by the user on a handwriting input panel; and hide or weaken display of an operation button on the handwriting input panel when the touch duration reaches a first preset value.

In some example implementations of this embodiment, the apparatus further includes a second detection unit configured to: monitor a touch stop duration upon detecting that the touch operation stops; and resume display of the operation button that is hidden or whose display is weakened when the touch stop duration reaches a second preset value.

In the apparatus provided in the foregoing embodiment of the present disclosure, a touch point position during a handwriting input process on a user device is detected in real time, then a display point position deviated from the touch point position is determined based on the touch point position and user-related information, and finally a touch point movement trajectory is presented based on the display point position. In this way, a displayed stroke can be deviated from a touch point of the user, so as to prevent a touch medium of the user device from covering and blocking the displayed stroke. Therefore, the user can see in real time a complete stroke during the handwriting input process, thereby improving the input efficiency and the input accuracy rate.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 6:
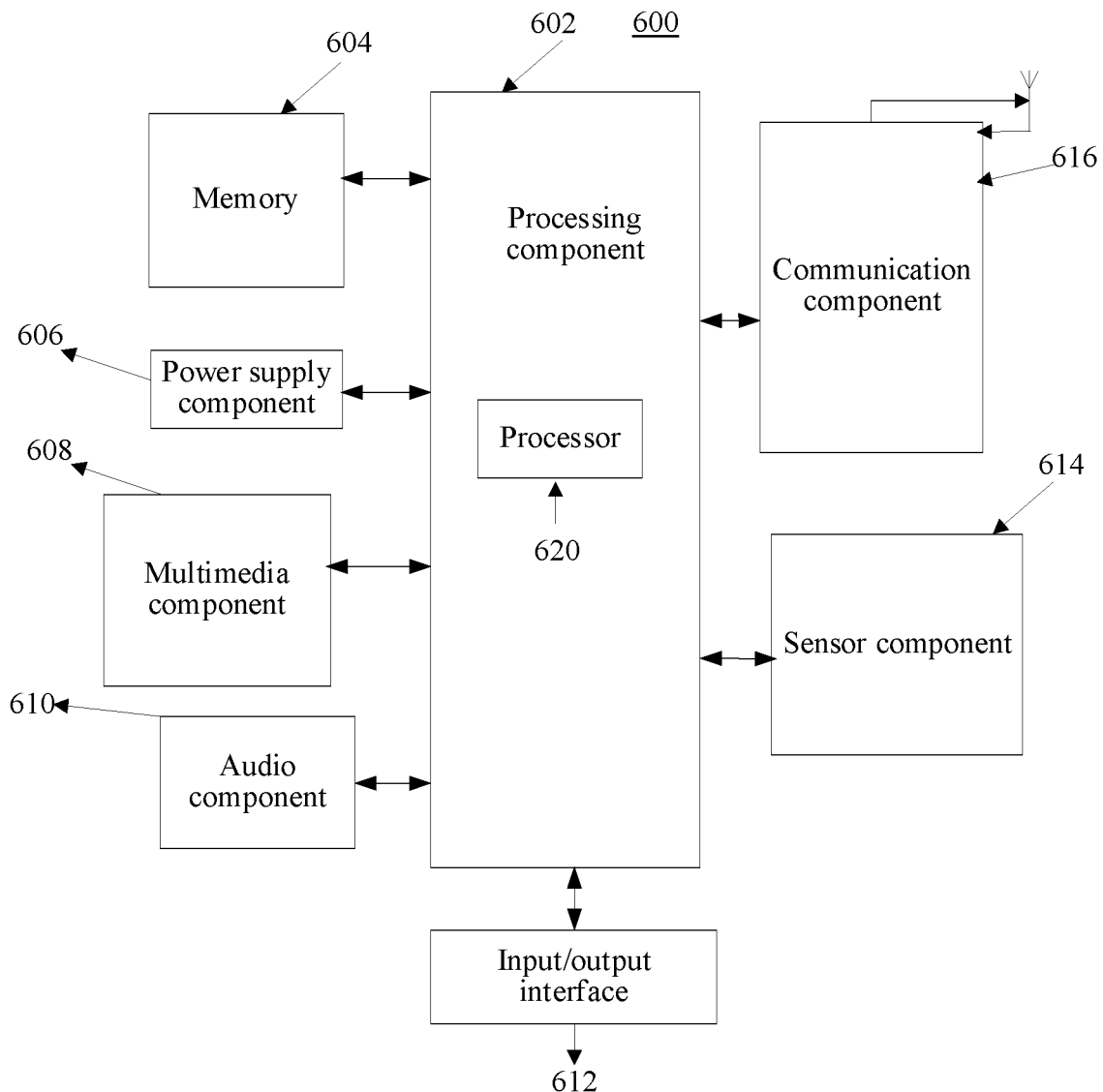
FIG. 6 is a schematic structural diagram of an apparatus for input according to the present disclosure.

FIG. 6 is a block diagram of an apparatus 600 for input according to an exemplary embodiment. The apparatus 600 may be an intelligent terminal or a server. For example, the apparatus 600 may be a mobile phone, a computer, a digital broadcasting terminal, a messaging device, a game console, a tablet device, a medical device, a fitness facility, a personal digital assistant, or the like.

Referring to FIG. 6, the apparatus 600 may include one or more of the following components: a processing component 602, a memory 604, a power supply component 606, a multimedia component 608, an audio component 610, an input/output (I/O) interface 612, a sensor component 614, and a communication component 616.

The processing component 602 usually controls the whole operation of the apparatus 600, such as operations associated with displaying, a phone call, data communication, a camera operation, and a recording operation. The processing component 602 may include one or more processors 620 to execute instructions, to complete all or some steps of the foregoing method. In addition, the processing component 602 may include one or more modules, to facilitate the interaction between the processing component 602 and other components. For example, the processing component 602 may include a multimedia module, to facilitate the interaction between the multimedia component 608 and the processing component 602.

The memory 604 is configured to store various types of data to support operations on the apparatus 600. Examples of the data include instructions, contact data, phonebook data, messages, pictures, videos, and the like of any application or method for being operated on the apparatus 600. The memory 604 may be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc, or an optical disc.

The power supply component 606 supplies power to various components of the apparatus 600. The power supply component 606 may include a power supply management system, one or more power supplies, and other components associated with generating, managing and allocating power for the apparatus 600.

The multimedia component 608 includes a screen providing an output interface between the apparatus 600 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and gestures on the TP. The touch sensor may not only sense the boundary of touching or sliding operations, but also detect a duration and a pressure related to the touching or sliding operations. In some embodiments, the multimedia component 608 includes a front-facing camera and/or a rear-facing camera. When the apparatus 600 is in an operating mode, such as a shooting mode or a video mode, the front-facing camera and/or the rear-facing camera may receive external multimedia data. Each front-facing camera and rear-facing camera may be a fixed optical lens system or have a focal length and an optical zooming capability.

The audio component 610 is configured to output and/or input an audio signal. For example, the audio component 610 includes a microphone (MIC), and when the apparatus 600 is in an operation mode, such as a call mode, a recording mode, and a voice identification mode, the MIC is configured to receive an external audio signal. The received audio signal may be further stored in the memory 604 or transmitted through the communication component 616. In some embodiments, the audio component 610 further includes a loudspeaker configured to output an audio signal.

The I/O interface 612 provides an interface between the processing component 602 and a peripheral interface module. The peripheral interface module may be a keyboard, a click wheel, buttons, or the like. The buttons may include, but are not limited to: a homepage button, a volume button, a start-up button, and a locking button.

The sensor component 614 includes one or more sensors, configured to provide state evaluation in each aspect to the apparatus 600. For example, the sensor component 614 may detect an on/off state of the apparatus 600, and relative positioning of the component. For example, the component is a display and a small keyboard of the apparatus 600. The sensor component 614 may further detect the position change of the apparatus 600 or one component of the apparatus 600, the existence or nonexistence of contact between the user and the apparatus 600, the azimuth or acceleration/deceleration of the apparatus 600, and the temperature change of the apparatus 600. The sensor component 614 may include a proximity sensor configured to detect the existence of nearby objects without any physical contact. The sensor component 614 may further include an optical sensor, such as a CMOS or CCD image sensor that is used in an imaging application. In some embodiments, the sensor component 614 may further include an acceleration sensor, a gyroscope sensor, a magnetic sensor, a pressure sensor, or a temperature sensor.

The communication component 616 is configured to facilitate communication in a wired or wireless manner between the apparatus 600 and other devices. The apparatus 600 may access a wireless network based on communication standards, such as WiFi, 2G, or 3G, or a combination thereof. In an exemplary embodiment, the communication component 616 receives a broadcast signal or broadcast-related information from an external broadcast management system through a broadcast channel. In an exemplary embodiment, the communication component 616 further includes a near field communication (NFC) module, to promote short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 600 may be implemented by using one or more application-specific integrated circuits (ASIC), a digital signal processor (DSP), a digital signal processing device (DSPD), a programmable logic device (PLD), a field programmable gate array (FPGA), a controller, a micro-controller, a microprocessor, or another electronic element, so as to perform the foregoing method.

In an exemplary embodiment, a non-transitory computer-readable storage medium including instructions, for example, a memory 604 including instructions, is further provided, and the instructions may be executed by the processor 620 of the apparatus 600 to complete the foregoing method. For example, the non-transitory computer-readable storage medium may be a ROM, a random access memory (RAM), a CD-ROM, a magnetic tape, a floppy disk, an optical data storage device, or the like.

Figure 7:
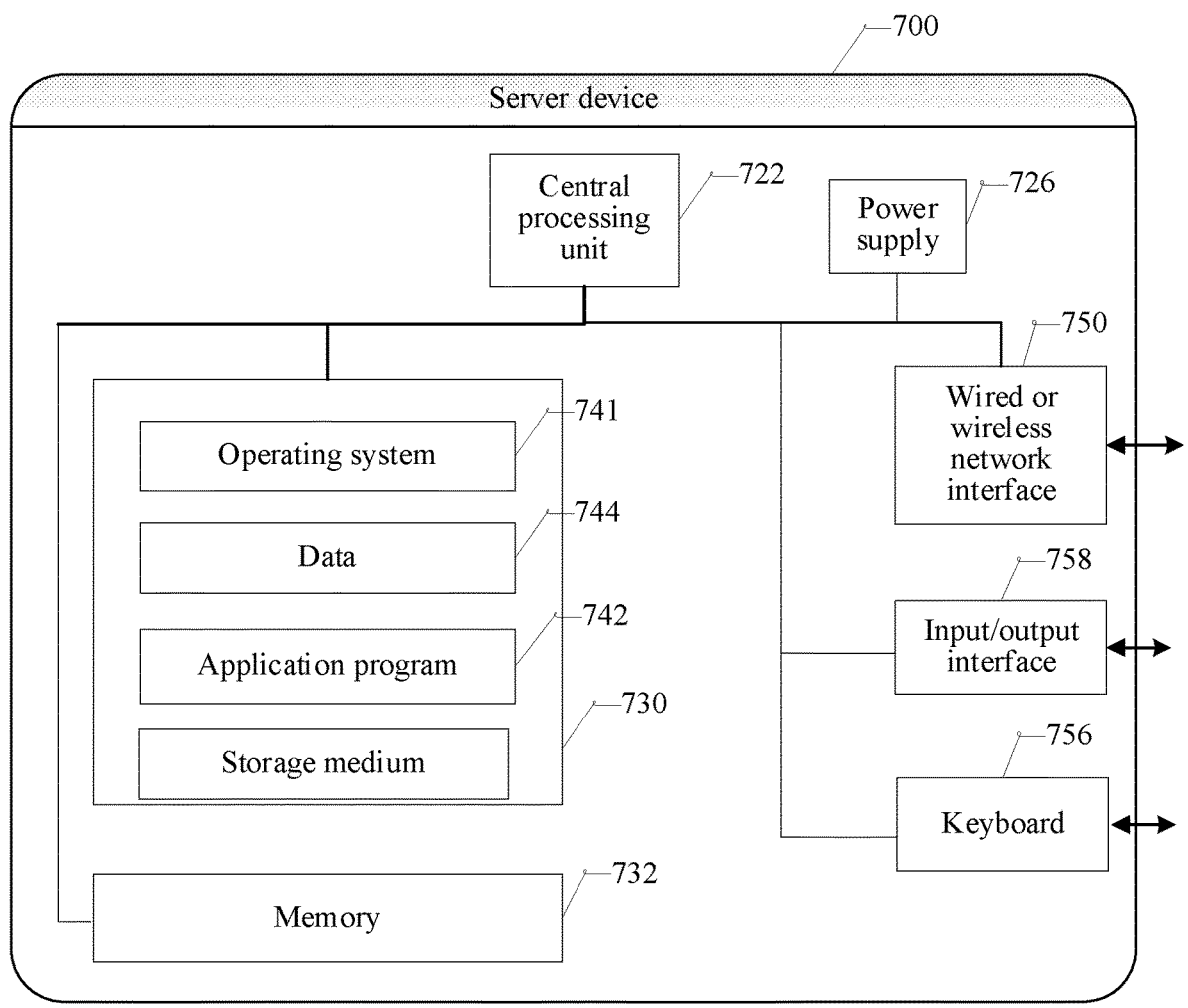
FIG. 7 is a schematic structural diagram of a server according to some embodiments of the present disclosure.

FIG. 7 is a schematic structural diagram of a server according to some embodiments of the present disclosure. A server 700 may vary greatly due to different configurations or performance, and may include one or more central processing units (CPU) 722 (for example, one or more processors) and memories 732, and one or more storage media 730 (for example, one or more mass storage devices) storing an application program 742 or data 744. The memory 732 and the storage medium 730 may be transient or persistent storages. The program stored in the storage medium 730 may include one or more modules (not marked in the figure), and each module may include a series of instruction operations to the server. Furthermore, the CPU 722 may be configured to communicate with the storage medium 730, and perform, on the server 700, the series of instruction operations in the storage medium 730.

The server 700 may further include one or more power supplies 726, one or more wired or wireless network interfaces 750, one or more input/output interfaces 758, one or more keyboards 756, and/or, one or more operating systems 741, for example, Windows Server™, Mac OS X™, Unix™, Linux™, and FreeBSD™.

A non-transitory computer-readable storage medium is provided. When instructions in the storage medium are executed by a processor of an apparatus (an intelligent terminal or a server), the apparatus is enabled to perform the input method. The foregoing method includes: detecting in real time a touch point position during a handwriting input process on a user device; determining a display point position based on the touch point position and user-related information, the display point position being deviated from the touch point position; and presenting a touch point movement trajectory based on the display point position.

In some embodiments, the user-related information includes a preset position offset defined by the user; and the determining a display point position based on the touch point position and user-related information includes: determining the display point position based on the touch point position and the preset position offset.

In some embodiments, the user-related information includes real-time touch information; and the determining a display point position based on the touch point position and user-related information includes: determining a target position offset based on the real-time touch information; and determining the display point position based on the touch point position and the target position offset.

In some embodiments, the real-time touch information includes at least one of the following: a touch manner, a touch point pressure, or a touch point area.

In some embodiments, the touch manner includes at least one of the following: a touch by a left hand, or a touch by a right hand.

In some embodiments, the determining a target position offset based on the real-time touch information includes: predicting a size of a touch medium of the user device based on the touch point pressure and the touch point area; determining a direction of the display point position relative to the touch point position based on the touch manner; and determining the target position offset based on the size of the touch medium and the direction.

In some embodiments, the apparatus is configured such that one or more processors execute the instructions in the one or more programs to perform the following operations: monitoring a touch duration upon detecting a touch operation by the user on a handwriting input panel; and hiding or weakening display of an operation button on the handwriting input panel when the touch duration reaches a first preset value.

In some embodiments, the apparatus is configured such that one or more processors execute the instructions in the one or more programs to perform the following operations: monitoring a touch stop duration upon detecting that the touch operation stops; and resuming display of the operation button that is hidden or whose display is weakened when the touch stop duration reaches a second preset value.

A person skilled in the art can easily figure out another implementation solution of the present disclosure after considering the specification and practicing the present disclosure that is disclosed herein. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

The above are only exemplary embodiments of the present disclosure and are not intended to limit the present disclosure. Any modification, equivalent replacement, or improvement made within the spirit and principle of the present disclosure shall be included in the protection scope of the present disclosure.

The input method and apparatus, and the apparatus for input provided in the present disclosure are described in detail above. The principle and implementations of the present disclosure are described herein by using specific examples. The descriptions of the foregoing embodiments are merely used for helping understand the method and core ideas of the present disclosure. In addition, a person of ordinary skill in the art can make variations and modifications to the present disclosure in terms of the specific implementations and application scopes according to the ideas of the present disclosure. Therefore, the content of this specification shall not be construed as a limit to the present disclosure.

What is claimed is:

1. An input method, comprising:
   displaying a handwriting input panel on an interface of the input method application, the handwriting input panel comprising a blank area and an operation area for displaying at least one operation button at a fixed position;
   detecting in real time a touch point position within the interface of the input method application during a handwriting input process;
   determining a display point position based on the touch point position and user-related information, the display point position being deviated from the touch point position;
   monitoring a touch duration upon detecting a touch operation on the handwriting input panel;
   hiding or weakening display of the operation area on the handwriting input panel upon detecting that the touch duration reaches a first preset value; and
   presenting a touch point movement trajectory based on the display point position.

2. The method according to claim 1, wherein the user-related information comprises a preset position offset; and
   the determining a display point position based on the touch point position and user-related information comprises:
   determining the display point position based on the touch point position and the preset position offset.

3. The method according to claim 1, wherein the user-related information comprises real-time touch information; and
   the determining a display point position based on the touch point position and user-related information comprises:
   determining a target position offset based on the real-time touch information; and
   determining the display point position based on the touch point position and the target position offset.

4. The method according to claim 3, wherein the real-time touch information comprises at least one of: a touch manner, a touch point pressure, or a touch point area.

5. The method according to claim 4, wherein the touch manner comprises at least one of: a touch by a left hand, a touch by a right hand, or a touch by both hands.

6. The method according to claim 4, wherein the determining a target position offset based on the real-time touch information comprises:
   predicting a size of a touch medium of the user device based on the touch point pressure and the touch point area;
   determining a direction of the display point position relative to the touch point position based on the touch manner; and
   determining the target position offset based on the size of the touch medium and the direction.

7. The method according to claim 1, further comprising:
   monitoring a touch stop duration upon detecting that the touch operation stops; and
   resuming display of the operation button that is hidden or whose display is weakened when the touch stop duration reaches a second preset value.

8. An apparatus for input, comprising a memory and one or more programs, the one or more programs being stored in the memory, the apparatus being configured such that one or more processors execute instructions in the one or more programs to perform:
   displaying a handwriting input panel on an interface of the input method application, the handwriting input panel comprising a blank area and an operation area for displaying at least one operation button at a fixed position;
   detecting in real time a touch point position within the interface of the input method application during a handwriting input process;
   determining a display point position based on the touch point position and user-related information, the display point position being deviated from the touch point position;
   monitoring a touch duration upon detecting a touch operation on the handwriting input panel;
   hiding or weakening display of the operation area on the handwriting input panel upon detecting that the touch duration reaches a first preset value; and
   presenting a touch point movement trajectory based on the display point position.

9. The apparatus according to claim 8, wherein the user-related information comprises a preset position offset; and
   the determining a display point position based on the touch point position and user-related information comprises:
   determining the display point position based on the touch point position and the preset position offset.

10. The apparatus according to claim 8, wherein the user-related information comprises real-time touch information; and
the determining a display point position based on the touch point position and user-related information comprises:
determining a target position offset based on the real-time touch information; and
determining the display point position based on the touch point position and the target position offset.

11. The apparatus according to claim 10, wherein the real-time touch information comprises at least one of: a touch manner, a touch point pressure, or a touch point area.

12. The apparatus according to claim 11, wherein the touch manner comprises at least one of: a touch by a left hand, a touch by a right hand, or a touch by both hands.

13. The apparatus according to claim 11, wherein the determining a target position offset based on the real-time touch information comprises:
predicting a size of a touch medium of the user device based on the touch point pressure and the touch point area;
determining a direction of the display point position relative to the touch point position based on the touch manner; and
determining the target position offset based on the size of the touch medium and the direction.

14. The apparatus according to claim 8, wherein the apparatus is configured such that the one or more processors execute the instructions in the one or more programs to perform the following operations:
monitoring a touch stop duration upon detecting that the touch operation stops; and
resuming display of the operation button that is hidden or whose display is weakened when the touch stop duration reaches a second preset value.

15. A non-transitory computer-readable medium, storing a computer program, the computer program, when executed by a processor, causing the processor to perform:
displaying a handwriting input panel on an interface of the input method application, the handwriting input panel comprising a blank area and an operation area for displaying at least one operation button at a fixed position;
detecting in real time a touch point position within the interface of the input method application during a handwriting input process;
determining a display point position based on the touch point position and user-related information, the display point position being deviated from the touch point position;
monitoring a touch duration upon detecting a touch operation on the handwriting input panel;
hiding or weakening display of the operation area on the handwriting input panel upon detecting that the touch duration reaches a first preset value; and
presenting a touch point movement trajectory based on the display point position.

16. The storage medium according to claim 15, wherein the user-related information comprises a preset position offset; and
the determining a display point position based on the touch point position and user-related information comprises:
determining the display point position based on the touch point position and the preset position offset.

17. The storage medium according to claim 15, wherein the user-related information comprises real-time touch information; and
the determining a display point position based on the touch point position and user-related information comprises:
determining a target position offset based on the real-time touch information; and
determining the display point position based on the touch point position and the target position offset.

18. The method according to claim 1, wherein at least part of the operation area is uncovered by the touch point movement trajectory.

19. The method according to claim 1, wherein a handwriting region when the operation area is hidden or weakened is larger than a handwriting region before the touch duration reaches the first preset value.

* * * * *